US010875960B2

(12) United States Patent
Meng et al.

(10) Patent No.: US 10,875,960 B2
(45) Date of Patent: Dec. 29, 2020

(54) SILANE-MODIFIED POLYESTER BLENDS AND METHODS OF PREPARATION

(71) Applicant: UT-Battelle, LLC, Oak Ridge, TN (US)

(72) Inventors: Xiangtao Meng, Allentown, PA (US); Soydan Ozcan, Oak Ridge, TN (US); Halil Tekinalp, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 16/110,138

(22) Filed: Aug. 23, 2018

(65) Prior Publication Data
US 2019/0062495 A1 Feb. 28, 2019

Related U.S. Application Data

(60) Provisional application No. 62/549,193, filed on Aug. 23, 2017.

(51) Int. Cl.
*C08G 63/91* (2006.01)
*C08L 67/03* (2006.01)
(Continued)

(52) U.S. Cl.
CPC ......... *C08G 63/916* (2013.01); *C08G 63/912* (2013.01); *C08K 5/5419* (2013.01);
(Continued)

(58) Field of Classification Search
CPC .................................................. C08K 5/5419
See application file for complete search history.

(56) References Cited

U.S. PATENT DOCUMENTS 3,488,318 A * 1/1970 Carlson ................ C08K 5/5419
524/264
3,652,493 A * 3/1972 Stewart ................ C08K 5/5403
524/265
(Continued)

FOREIGN PATENT DOCUMENTS

EP 2770015 B1 3/2018
JP 2009173701 A * 8/2009

OTHER PUBLICATIONS

Machine Translation of JP-2009173701-A, 2019 (Year: 2019).*
(Continued)

*Primary Examiner* — Liam J Heincer
(74) *Attorney, Agent, or Firm* — Scully, Scott, Murphy & Presser, P.C.

(57) ABSTRACT

A silane-modified polyester blend comprising a polyester polymer homogeneously blended with silane molecules containing two or three alkoxy groups bound to the silicon atom, wherein said silane molecules are present in said polyester blend in an amount of 0.05-20 wt % (or, e.g., 0.05-10 wt %, 0.05-5 wt %, or 0.05-2 wt %). The polyester polymer may, in particular embodiments, be a polyhydroxyalkanoate, terephthalate-based polyester, adipate-based, or succinate-based polyester. The silane molecule may be according to the formula $(R^2O)_2SiR^3R^4$, wherein $R^2$ groups are independently selected from alkyl groups containing 1-4 carbon atoms; and $R^3$ and $R^4$ are independently selected from $OR^2$ groups and alkyl groups containing 1-12 carbon atoms, provided that at least one of $R^3$ and $R^4$ is an alkyl group, wherein the alkyl group optionally includes one or more heteroatoms selected from oxygen, nitrogen, halogen, sulfur, phosphorus, and silicon. Methods for producing the silane-modified polyester blend are also described.

19 Claims, 16 Drawing Sheets
(12 of 16 Drawing Sheet(s) Filed in Color)

(51) Int. Cl.
C08L 67/04 (2006.01)
C08K 5/5419 (2006.01)
C08K 3/22 (2006.01)

(52) U.S. Cl.
CPC .............. *C08L 67/03* (2013.01); *C08L 67/04* (2013.01); *C08K 3/22* (2013.01)

(56) References Cited

U.S. PATENT DOCUMENTS

| | | | | |
|---|---|---|---|---|
| 4,551,485 | A * | 11/1985 | Ragan | C08K 5/54 523/212 |
| 2004/0116639 | A1* | 6/2004 | Lim | C08L 83/04 528/10 |
| 2010/0292381 | A1* | 11/2010 | Kamikawa | C08K 5/14 524/394 |
| 2011/0060080 | A1* | 3/2011 | Kishimoto | C08K 9/06 524/188 |
| 2011/0178238 | A1* | 7/2011 | Koschabek | C09D 167/02 524/605 |
| 2015/0018472 | A1* | 1/2015 | Gaston | C09D 143/04 524/380 |

OTHER PUBLICATIONS

Calabia et al. (Polymers 2013, 5, 128-141) (Year: 2013).*
Pademi et al. (Materials 2014, 7, 751-768) (Year: 2014).*
Basilissi et al. (J. Appl. Polym. Sci. 2013, 3057-3063) (Year: 2013).*
Wang et al. (Polymer Degradation and Stability 93 (2008) 1397-1404) (Year: 2008).*
Santos et al. (Polirneros, vol. 24, n. 5, p. 561-566, 2014) (Year: 2014).*
Xu Y.Q. et al., "Mechanical and Rheological Properties of Epoxidized Soybean Oil Plasticized Poly(lactic acid)", Journal of Applied Polymer Science, (2009), vol. 112, pp. 3185-3191 DOI 10.1002/app.29797.
Harada M. et al., "Increased Impact Strength of Biodegradable Poly(lactic acid)/Poly(butylene succinate) Blend Composites by Using Isocyanate as a Reactive Processing Agent", Journal of Applied Polymer Science, (2007), vol. 106, pp. 1813-1820 DOI 10.1002/app.26717.
Jaswal S. et al., "New trends in vinyl ester resins", Reviews in Chemical Engineering, (2014), vol. 30, 15 pages DOI 10.1515/revce-2014-0012.
Yang H. et al., "Comparison of Unsaturated Polyester and Vinylester Resins in Low Temperature Polymerization", Journal of Applied Polymer Science, (2001), vol. 79, pp. 1230-1242.
Sinha Ray S. et al., "Biodegradable polymers and their layered silicate nanocomposites: In greening the 21st century materials world", Progress in Materials Science, (2005), vol. 50, pp. 962-1079 DOI 10.1016/j.pmatsci.2005.05.002.
Basilissi L. et al., "Synthesis and Characterization of PLA Nanocomposites Containing Nanosilica Modified With Different Organosilanes 1. Effect of the Organosilanes on the Properties of Nanocomposites: Macromolecular, Morpological, and Rheologic Characterization", Journal of Applied Polymer Science DOI:10.1002/APP.38324, pp. 1575-1582 (2013).

* cited by examiner

SILANE-MODIFIED POLYESTER BLENDS AND METHODS OF PREPARATION

CROSS REFERENCE TO RELATED APPLICATION

The present application claims benefit of U.S. Provisional Application No. 62/549,193, filed on Aug. 23, 2017, all of the contents of which are incorporated herein by reference.

GOVERNMENT SUPPORT

This invention was made with government support under Prime Contract No. DE-AC05-000R22725 awarded by the U.S. Department of Energy. The government has certain rights in the invention.

FIELD OF THE INVENTION

The present invention relates generally to polymer blends, and more particularly, to polyester blends, such as blends of polylactic acid (PLA).

BACKGROUND OF THE INVENTION

Poly(lactic acid) (PLA), which is commonly made from renewable resources, is a high strength, high modulus thermoplastic polyester that was first discovered in 1932 by Carothers (DuPont). Such features as good biodegradability and biocompatibility, and acceptable strength, stiffness, and processability have made PLA one of the most promising biopolymers with the potential to replace petroleum-based polymers. Due to these unique properties, PLA has already been applied to packaging and surgical implants. However, broader applications and larger scale demand of PLA as a commodity thermoplastic have been limited by several major drawbacks. Among them, intrinsic brittleness that originates from semi-rigid chains is one of the major barriers to durable applications. Other drawbacks, such as poor melt strength, restrict its use in such areas as 3D printing, film blowing, and foaming.

Almost since its first discovery, much research has been devoted to developing tougher and more ductile PLA materials, and a remarkable surge in this effort has been witnessed in the past decade in accordance with an increasing effort in finding bioplastic alternatives to petroleum-based polymers. Various strategies have been employed to improve the toughness and ductility of PLA, including adding small molecular plasticizers, blending with other ductile polymers, copolymerization, and nanocomposites. These approaches have, indeed, resulted in PLA materials with increased ductility and toughness. However, in most cases, strengths and moduli (e.g. tensile) decreased dramatically in adverse compensation for the improvement in ductility. For example, epoxidized soybean oil has been used as a plasticizer to increase the elongation to break of PLA by 63%, but with a decrease in tensile strength and modulus by 27% and 23%, respectively (Y. Q. Xu, et al., *Journal of Applied Polymer Science*, 112(6) (2009) 3185-3191). As is well known, toughening typically involves processes of stress yielding, craze formation, or a combination of both (e.g., M. Harada et al., *Journal of Applied Polymer Science* 106(3) (2007) 1813-1820. Addition of a plasticizer or another "soft" polymer facilitates chain segmental motion and chain sliding, and lowers the stress requirement for both of the above processes. As a result, a decrease in glass transition temperature ($T_g$), tensile strength, and modulus is often observed. Moreover, the additives are often not compatible with the PLA matrix, thus leading to separated phases and weak interfaces, which further lowers the strength. In view of the above, there would be a particular benefit in PLA and other polyester compositions that depart from the conventional compositions of the art by having superior toughness, as exhibited by substantial ductility along with substantial strength and modulus.

SUMMARY OF THE INVENTION

The instant invention is foremost directed to high performance silane-modified polyester blends. In specific embodiments, the silane-modified polyester blend includes a polyester polymer homogeneously blended with silane molecules containing two or three alkoxy groups bound to the silicon atom, wherein the silane molecules are present in the polyester blend in an amount of 0.05-20 wt %. The polyester blends described herein advantageously exhibit a combination of exceptional ductility and toughness. Thus, by this invention, these bioplastic (polyester) alternatives that have heretofore been substantially limited in their use can now be directed to a broader range of applications, including more critical or rugged applications that have traditionally been better suited to petroleum-based polymers.

In another aspect, the invention is directed to a novel and facile method to prepare these tough polyester materials. In particular embodiments, the PLA-organosilane hybrids advantageously require a low amount of organosilane, e.g., 0.5-1 wt %. As further discussed below, in situ formation of a nanoscale PLA-silane architecture due to silane condensation and grafting of PLA chains is a plausible mechanism for providing the improved toughness. As further discussed later in this application, tensile property tests, differential scanning calorimetry (DSC), dynamic mechanical analysis (DMA), rheological analysis, dynamic light scattering (DLS), and scanning electron microscopy (SEM) were all utilized to characterize the mechanical properties, microstructure, morphology, and underlying mechanisms at work in their preparation. Notably, the methods and mechanisms reported here can be extended to a range of polyester polymers beyond PLA, such as polyhydroxyalkanoates (PHA), polyethylene terephthalate (PET), and polybutylene terephthalate (PBT).

BRIEF DESCRIPTION OF THE FIGURES

The file of this patent contains at least one drawing executed in color. Copies of this patent with color drawing(s) will be provided by the Patent and Trademark Office upon request and payment of the necessary fee.

FIGS. 10A, 10B, and 10C show the results for PLA blends containing APTES, ICPTES, and MTMS, respectively, each in varying concentrations of 0.5%, 1%, and 2%. FIG. 10D compares the results for PLA blends containing 0.5% APTES, 0.5% APTES, and 0.5% MTMS.

DETAILED DESCRIPTION OF THE INVENTION

Figure 1:
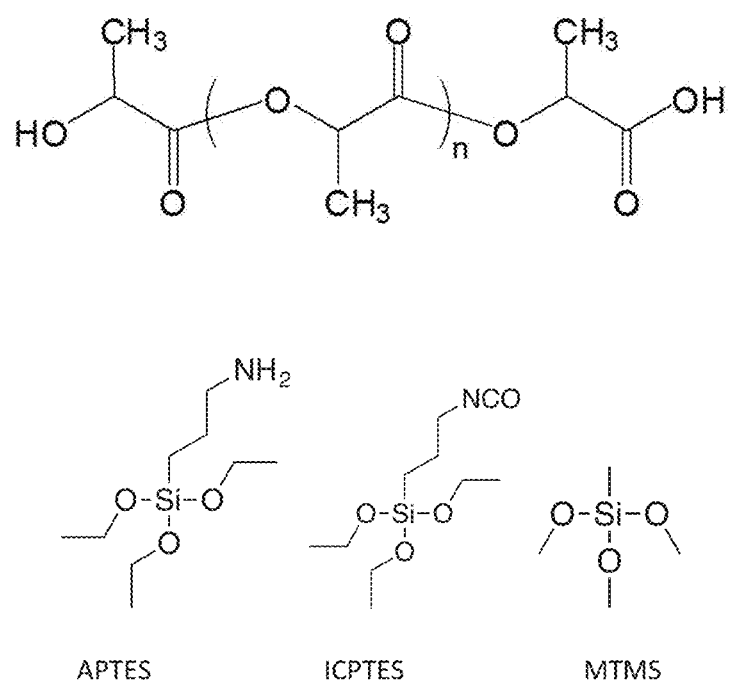
FIG. 1 shows structures of polylactic acid (PLA) and the following three silane molecules: 3-aminopropyltriethoxysilane (APTES), 3-(triethoxysilyl)propylisocyanate (ICPTES), and trimethoxymethylsilane (MTMS).

The polyester blends described herein contain, as a first component, one or more polyester polymers (also referred to herein as "polyesters"). The polyester polymers considered herein are polymers containing ester (—C(O)O—) linkages at least in a backbone of the polymers. The polyester polymer may or may not also have ester groups in pendant portions of the polymer. The polyester polymer can have any of a variety of possible number-average ($M_n$) or weight-average ($M_w$) molecular weights. In different embodiments, the polyester polymer has a molecular weight of about, at least, greater than, up to, or less than, for example, 1,000 g/mol, 2,000 g/mol, 5,000 g/mol, 10,000 g/mol, 20,000 g/mol, 30,000 g/mol, 40,000 g/mol, 50,000 g/mol, 75,000 g/mol, 100,000 g/mol, 150,000 g/mol, 200,000 g/mol, 300,000 g/mol, 500,000 g/mol, or 1,000,000 g/mol, or a molecular weight within a range bounded by any two of the foregoing exemplary values.

In some embodiments, the polyester is a polyhydroxyalkanoate, which corresponds to the following generic structure:

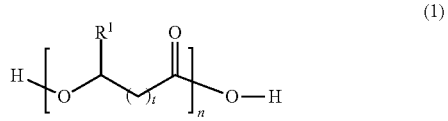

(1)

In Formula (1), $R^1$ is selected from a hydrogen atom (H) or hydrocarbon group (R), t is an integer from 0 to 5, and n is an integer of at least 5. The hydrocarbon group (R) can be any saturated or unsaturated hydrocarbon group, typically containing 1, 2, 3, 4, 5, 6, 7, 8, 9, 10, 11, or 12 carbon atoms or a number of carbon atoms within a range bounded by any two of the foregoing values (e.g., 1-12, 2-12, 3-12, 1-6, 1-4, or 1-3 carbon atoms). The hydrocarbon group (R) may be, for example, a straight-chained (linear) or branched alkyl or alkenyl group, or saturated or unsaturated cyclic hydrocarbon group. In some embodiments, the hydrocarbon group (R) is an alkyl group having one, two, three, four, five, or six carbon atoms, such as a methyl, ethyl, n-propyl, isopropyl, n-butyl, sec-butyl, n-pentyl, isopentyl, cyclopentyl, n-hexyl, isohexyl, or cyclohexyl group. The hydrocarbon group may, in some cases, be an unsaturated ring, such as a phenyl group. The hydrocarbon group may also be composed solely of carbon and hydrogen atoms, or may contain one or more heteroatoms selected from oxygen, nitrogen, and halogen atoms. Thus, in the case of cyclic hydrocarbon groups, the cyclic group may be a carbocyclic group or a heterocyclic group. The subscript t is typically an integer from 0 to 3 (i.e., t is typically 0, 1, 2, or 3). The subscript n is typically an integer of at least 5, 10, 20, 50, 100, 200, 500, 1000, 1500, 2000, 2500, or 5000, or within a range bounded therein, or n can be a value that results in any of the exemplary molecular weights provided above.

When t is 0, Formula (1) depicts a polymer of an alpha-hydroxy (α-hydroxy) acid. An example of an α-hydroxy polymer when $R^1$ in Formula (1) is H is polyglycolic acid. An example of an α-hydroxy polymer when $R^1$ is methyl is polylactic acid (i.e., PLA, polymer of 2-hydroxypropionic acid, also known as poly-L-lactic acid, poly-D-lactic acid, or poly-DL-lactic acid). An example of an α-hydroxy polymer when $R^1$ is phenyl is polymandelic acid. When t is 1, Formula (1) depicts a polymer of a beta-hydroxy (β-hydroxy) acid. An example of a β-hydroxy polymer when $R^1$ is H is poly(3-hydroxypropionic acid). An example of a β-hydroxy polymer when $R^1$ is methyl is poly(3-hydroxybutyric acid) (i.e., P3HB). An example of a β-hydroxy polymer when $R^1$ is ethyl is poly(3-hydroxyvaleric acid) (i.e., PHV). An example of a β-hydroxy polymer when $R^1$ is n-propyl is poly(3-hydroxyhexanoic acid) (i.e., PHH). When t is 2, Formula (1) depicts a polymer of a gamma-hydroxy (γ-hydroxy) acid. An example of a γ-hydroxy polymer when $R^1$ is H is poly(4-hydroxybutyric acid) (i.e., P4HB). An example of a γ-hydroxy polymer when $R^1$ is methyl is poly(4-hydroxyvaleric acid). Some examples of polyhydroxyalkanoates with t=3 include poly(5-hydroxyvaleric acid) and poly(5-hydroxyhexanoic acid). An example of a polyhydroxyalkanoate with t=4 includes poly(6-hydroxyhexanoic acid), also known as polycaprolactone (PCL). In some cases, the polyhydroxyalkanoate may be selected from poly(hydroxypropionic acid)s, poly(hydroxybutyric acid)s, poly(hydroxyvaleric acid)s, or poly(hydroxyhexanoic acid)s. The hydroxy acid need not be within the scope of Formula (1) to be suitable. For example, a polymer of salicylic acid may or may not also be considered.

Copolymers of the hydroxy acids are also considered herein. In some embodiments, two or more different types of hydroxyalkanoates are in the copolymer, such as in (poly(lactic-co-glycolic acid), poly(3-hydroxybutyrate-co-3-hydroxyvalerate) (i.e., PHBV), or poly(3-hydroxybutyrate-co-3-hydroxyhexanoate). In other embodiments, the copolymer includes one or more non-hydroxyalkanoate portions, as in poly(glycolide-co-trimethylene carbonate) and poly(lactide-co-polyethylene glycol).

In some embodiments, the polyester is a diol-diacid type of polyester, i.e., a polyester resulting from the condensation of a diol with a diacid. The diol-diacid types of polyesters can be defined by the following generic structure:

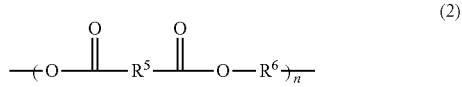

(2)

In the above Formula (2), $R^5$ and $R^6$ are independently selected from hydrocarbon linking groups, which can be derived from hydrocarbon groups (R) containing 1-12 carbon atoms, as defined above, by replacing another hydrogen atom of the hydrocarbon group with a bond. For example, a methyl (—$CH_3$) group can have a hydrogen atom removed to result in a methylene (—$CH_2$—) linking group corresponding to $R^5$ and/or $R^6$. In some embodiments, one or both (or at least one) of the linking groups $R^5$ and $R^6$ are independently selected from alkylene groups, i.e., linking groups of the formula —$(CH_2)_m$—, where m is typically 1-12. In other embodiments, one or both (or at least one) of the linking groups $R^5$ and $R^6$ are independently selected from saturated or unsaturated carbocyclic or heterocyclic groups (e.g., cyclopentyl, cyclohexyl, phenylene, and furan groups). In a first set of particular embodiments, $R^5$ is phenylene and $R^6$ is an alkylene group, in which case the polyester can be generally classified as a polyalkylene terephthalate. In the case where $R^5$ is phenylene and $R^6$ is methylene (—$CH_2$—), the polyester is a polymethylene terephthalate (PMT); in the case where $R^5$ is phenylene and $R^6$ is ethylene (—$CH_2CH_2$—), the polyester is a polyethylene terephthalate (PET); in the case where $R^5$ is phenylene and $R^6$ is propylene (—$CH_2CH_2CH_2$—), the polyester is a polypropylene terephthalate (PPT); in the case where $R^5$ is phenylene and $R^6$ is butylene (—$CH_2CH_2CH_2CH_2$—), the polyester is a polybutylene terephthalate (PBT). In a second set of particular embodiments, $R^5$ and $R^6$ are independently selected from alkylene groups. In the particular case where $R^5$ is ethylene, the polyester of Formula (2) is herein referred to as a succinate-based polyester, e.g., a polyethylene succinate, when $R^6$ is also ethylene; or a polypropylene succinate, when $R^6$ is propylene; or a polybutylene succinate, when $R^6$ is butylene. In the particular case where $R^5$ is butylene, the polyester of Formula (2) is herein referred to as an adipate-based polyester, e.g., a polyethylene adipate, when $R^6$ is ethylene; or a polypropylene adipate, when $R^6$ is propylene; or a polybutylene adipate, when $R^6$ is also butylene. In some embodiments, $R^5$ in Formula (2) may be a bond, which results in oxalate-based polyesters, such as polyethylene oxalates, when $R^6$ is ethylene. Other less common or more specialized polyesters according to Formula (2) are considered herein, such as when $R^5$ is naphthyl, which corresponds to the naphthalate-based polyesters, such as polyethylene naphthalate (PEN), when $R^6$ is ethylene, or polybutylene naphthalate (PBN), when $R^6$ is butylene.

The polyester may alternatively be any of the vinyl ester and unsaturated polyester resins well known in the art. Vinyl ester resins are described, for example, in S. Jaswal et al., *Reviews in Chemical Engineering*, 30(6), 567-581 (2014); H. M. Kang et al., *Journal of Applied Polymer Science*, 79:1042-1053 (2001); and M. A. F. Robertson et al., *J. Adhesion*, 71:395-416 (1999), the contents of which are herein incorporated by reference in their entirety. Unsaturated polyester resins are described in, for example, H. Yang et al., *Applied Polymer*, 79(7), 1230-1242, 2001; M. Malik et al., *J. Macromol. Sci. Rev. Macromol. Chem. Phys.*, C40(2&3), 139-165 (2000); and M. Olesky et al., *Ind. Eng. Chem. Res.*, 52(20), 6713-6721 (2013), the contents of which are herein incorporated by reference in their entirety.

For purposes of the present invention, any one or combination of the above-described polyester polymers is homogeneously blended with silane molecules containing two or three alkoxy groups bound to the silicon atom in each silane molecule, thereby resulting in a polyester blend. Silane molecules containing one or four alkoxy groups bound to the silicon atom may also be present, provided that the silane molecules containing two or three alkoxy groups are present in a predominant amount. The term "polyester blend," as used herein, refers to a solid solution in which discrete microscopic or nanoscopic regions of the polyester polymer and silane molecules are present. The term "homogeneous" refers to a state in which substantial integration at the microscale, nanoscale, or approaching the molecular level is present, but without losing the identity of each component. Generally, the polyester polymer functions as a matrix in which microscale or nanoscale domains of the silane molecules (in unchanged form or in the form of a condensate with Si—O—Si bonds) are dispersed. In some embodiments, the silane molecules undergo condensation with each other (i.e., self-condensation) to form microscale or nanoscale silica cores homogeneously dispersed in the polyester blend. The silane molecules are generally present in the polyester blend in an amount of 0.05-20 wt % (by weight of the polyester blend). In different embodiments, the silane molecules are present in the polyester blend in an amount of 0.05, 0.1, 0.2, 0.5, 0.8, 1, 1.5, 2, 2.5, 3, 3.5, 4, 4.5, 5, 6, 7, 8, 9, 10, 12, 15, 18, or 20 wt %, or in an amount within a range bounded by any two of the foregoing values (e.g., 0.05-20 wt %, 0.05-15 wt %, 0.05-10 wt %, 0.05-5 wt %, 0.05-2 wt %, 0.05-1.5 wt %, 0.1-10 wt %, 0.1-5 wt %, 0.1-2 wt %, 0.1-1.5 wt %, 0.2-10 wt %, 0.2-5 wt %, 0.2-2 wt %, or 0.2-1.5 wt %).

The silane molecules containing two or three alkoxy groups also contain two or three hydrocarbon groups (R) attached to the silicon atom via a carbon atom. In particular embodiments, the silane molecules containing two or three alkoxy groups are defined by the following generic structure:

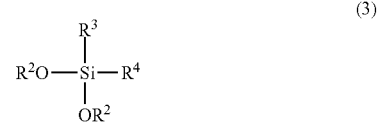

(3)

In Formula (3) above, the $R^2$ groups are independently selected from straight-chained or branched alkyl groups containing 1-4 carbon atoms, e.g., methyl, ethyl, n-propyl, isopropyl, n-butyl, sec-butyl, isobutyl, and t-butyl. The groups $R^3$ and $R^4$ are independently selected from $OR^2$ groups and alkyl groups containing 1-12 carbon atoms, provided that at least one of $R^3$ and $R^4$ (i.e., $R^3$ and/or $R^4$) is an alkyl group containing 1-12 carbon atoms. In some embodiments, $R^3$ is an $OR^2$ group and $R^4$ is an alkyl group; in other embodiments, both $R^3$ and $R^4$ are independently alkyl groups. Any of the alkyl groups exemplified above under hydrocarbon groups (R) are considered herein for $R^3$ and/or $R^4$.

In a first set of embodiments of Formula (3), the one or more alkyl groups (i.e., in $R^3$ and/or $R^4$) in the silane molecule are unsubstituted by containing only carbon and hydrogen atoms. Some examples of such silane molecules include trimethoxymethylsilane (MTMS), trimethoxyethylsilane, trimethoxypropylsilane, trimethoxybutylsilane, trimethoxypentylsilane, trimethoxyhexylsilane, trimethoxyheptylsilane, trimethoxyoctylsilane, trimethoxynonylsilane, trimethoxydecylsilane, trimethoxyundecylsilane, trimethoxydodecylsilane, dimethoxydimethylsilane, dimethoxydiethylsilane, dimethoxydipropylsilane, dimethoxydibutylsilane, dimethoxymethylethylsilane, dimethoxymethylbutylsilane, and further examples wherein methoxy in any of the foregoing examples is replaced with, for example, ethoxy, propoxy, or butoxy.

In a second set of embodiments of Formula (3), at least one alkyl group in the silane molecule contains one or more heteroatoms (e.g., oxygen, nitrogen, halogen, sulfur, phosphorus, and silicon atoms). Significantly, since the alkyl group may contain one or more silicon and oxygen atoms, the possibility is included of the silane molecule being a disiloxane, trisiloxane, tetrasiloxane, or higher siloxane. Nevertheless, in some embodiments, a disiloxane, trisiloxane, tetrasiloxane, or higher siloxane is excluded from the blend. In some embodiments, silsesquioxanes may be included or excluded from the blend. In some embodiments, the alkyl group in the silane molecule contains one or more heteroatoms interrupting a carbon-carbon bond (e.g., an —O— or —NH— heteroatom linker between carbon atoms). In other embodiments, the alkyl group contains one or more heteroatom-containing groups (e.g., —NH$_2$) that do not interrupt a carbon-carbon bond, although they may or may not also contain one or more heteroatoms interrupting a carbon-carbon bond.

Heteroatom-containing groups reactive with ester groups and/or hydroxy groups in the polyester polymer are of particular interest for purposes of the present invention since such groups are capable of forming covalent bonds between the silane molecules and polyester polymer. Some examples of such heteroatom-containing functional groups include amine (e.g., —NH$_2$ or —NHR), isocyanate (—NCO), epoxy, carboxylic acid (—COOH), carboxylic ester (—COOR), acid anhydride, carboxamide (—CONH$_2$ or —CONHR), ureido, and aldehyde groups. Some examples of suitable silane molecules containing such groups include (2-aminoethyl)triethoxysilane, (3-aminopropyl)triethoxysilane (APTES), N-(2-aminoethyl)-3-(trimethoxysilyl)propylamine, (4-aminobutyl)triethoxysilane, N-(6-aminohexyl)aminomethyltriethoxysilane, 1,3-bis[2-(aminoethyl)aminomethyl]-tetramethyldisiloxane, (3-trimethoxysilylpropyl)-diethylenetriamine, (3-aminopropyl)tris(methoxyethoxyethoxy)silane, 3-aminopropylpentamethyl-disiloxane, 3-aminopropylmethyldiethoxysilane, N-(2-aminoethyl)-3-aminoisobutylmethyl-dimethoxysilane, (aminoethylaminomethyl)phenethyltrimethoxysilane, 3-(triethoxysilyl)propylisocyanate (ICPTES), ureidopropyltrimethoxysilane, 3-(trimethoxysilyl)propionic acid, 4-(triethoxysilyl)butanoic acid, methyl 4-(triethoxysilyl)butanoate, 8-(trimethoxysilyl)octanoic acid, (3-glycidoxypropyl)trimethoxysilane, (3-glycidoxypropyl)methyldimethoxysilane, (3-glycidoxypropyl)bis(trimethylsiloxy)methylsilane, 5,6-epoxyhexyltriethoxysilane, 2-(3,4-epoxycyclohexyl)ethyltrimethoxysilane, methacryloxymethyltriethoxysilane, triethoxysilylbutyraldehyde, triethoxysilylundecanal, 3-(triethoxysilyl)propylsuccinic anhydride, 2-chloroethylmethyldimethoxysilane, and 3-bromopropyltrimethoxysilane.

In some embodiments, the polyester blend further includes filler particles, particularly filler particles having functional groups reactive with (generally, by condensing with) alkoxy groups in the silane molecules. Filler particles with such functionality can form covalent bonds between the filler particles and silane molecules, thereby increasing the cohesion between components in the blend. Some examples of filler materials that can favorably interact with the silane molecules include cellulosic particles (e.g., cellulose nanoparticles or nanofibrils) and metal oxide particles (e.g., beads), wherein the metal oxide may be, for example, silicon oxide (i.e., silica or glass), titanium oxide, yttrium oxide, zirconium oxide, iron oxide, zinc oxide, aluminum oxide, gallium oxide, indium oxide, tin oxide, magnesium oxide, or cerium oxide, or combination thereof. The filler material may also have a composition that ordinarily would not react with silane alkoxy groups, but wherein particles of the filler material have been surface-treated in such manner (e.g., by plasma treatment or coating with a sizing agent) as to functionalize surfaces of the particles with groups that can react with silane alkoxy groups. An example of such filler particles include carbon particles that have been functionalized with groups (e.g., hydroxy, carboxy, or amine, or other groups, as described above) that can react with the silane alkoxy groups. In some embodiments, a filler material that does not possess reactive functional groups (e.g., unfunctionalized carbon particles) may be included or excluded from the polyester blend. The filler material, if present, is generally present in the polyester blend in an amount of 0.05-20 wt % (by weight of the polyester blend). In different embodiments, the filler material is present in the polyester blend in an amount of 0.1, 0.2, 0.5, 0.8, 1, 1.5, 2, 2.5, 3, 3.5, 4, 4.5, 5, 6, 7, 8, 9, 10, 12, 15, 18, 20, 25, 30, 35, 40, 45, or 50 wt %, or in an amount within a range bounded by any two of the foregoing values (e.g., 0.1-50 wt %, 0.1-20 wt %, 0.1-10 wt %, 0.1-5 wt %, 0.1-1 wt %, 1-50 wt %, 1-20 wt %, 1-10 wt %, or 1-5 wt %).

The silane-modified polyester blend described herein is a solid material with an appreciable degree of tensile strength, tensile strain (elongation-to-break), and Young's modulus (elastic modulus). In a first set of embodiments, the polyester blend has a tensile strength of at least or greater than 50, 55, 60, 65, 70, or 75 MPa, or a tensile strength within a range bounded by any two of the foregoing values. In a second set of embodiments, the polyester blend has a tensile strain of at least or greater than 10, 15, 20, 25, 30, 40, 50, 60, 70, 80, 90, 100, 110, 120, 130, 140, or 150%, or a tensile strain within a range bounded by any two of the foregoing values. In a third set of embodiments, the polyester blend has a Young's modulus of at least or greater than 1, 1.1, 1.2, 1.3, 1.4, 1.5, 1.6, 1.7, 1.8, 1.9, or 2 GPa, or a Young's modulus within a range bounded by any two of the foregoing values. In a fourth set of embodiments, the polyester blend has a storage modulus (E') at 20° C. of at least or greater than 1000, 1200, 1500, 1800, 2000, 2200, 2500, 2800, or 3000 MPa. Some embodiments may also combine any of the physical values listed in the above first, second, third, and fourth embodiments.

In another aspect, the invention is directed to a process for preparing the polyester blend described above. In the method, a polyester polymer is homogeneously blended with silane molecules containing two or three alkoxy groups bound to the silicon atom, as described above, wherein the silane molecules are included in an amount of 0.05-20 wt %. The polyester and silane molecules can be homogeneously blended by any of the means well known in the art for homogeneously blending components in their solid or liquid (e.g., melted or solubilized) states. In particular embodiments, the polyester blend is prepared by first dissolving a solid polyester into an organic solvent (e.g., methylene chloride, chloroform, or acetonitrile) in which the polyester and silane are both soluble. The silane can then be dissolved into the solution containing the polyester. The resulting solution should be stirred for a sufficient period of time (e.g., at least 3, 6, 12, or 24 hours) to permit the silane molecules to react with the polyester and/or undergo condensation with each other. The resulting solution may then be cast onto a substrate and dried to produce a solid blend of desired shape, e.g., a film or block. If desired, the solid casted blend may be cured or hot (melt) pressed at a suitable temperature and then cooled to obtain a final article such as a film.

Examples have been set forth below for the purpose of illustration and to describe certain specific embodiments of the invention. However, the scope of this invention is not to be in any way limited by the examples set forth herein.

Examples

Preparation of PLA-Silane Blends

Ten grams (10 g) of PLA 4043D ($T_g$ of 55-6° 0 C, tensile yield strength of about 60 MPa, tensile strength at break of about 53 MPa, tensile modulus of about 3.6 MPa, tensile elongation of about 6%) was dissolved in 50 mL dichloromethane under magnetic stirring in a 250 mL round bottom flask at room temperature. A designated amount of a silane reagent (0.25 to 2 wt %) was then added, followed by stirring overnight to permit completion of the reaction. The afforded dichloromethane solution was cast onto a PTFE sheet and dried at room temperature for 8 hours, followed by drying at 40° C. under vacuum for 12 hours to form PLA-silane films. These films were then hot pressed at 175° C. for 5 minutes and cooled to room temperature at a rate of 10° C./min to obtain the final films. Other blends containing a silane, as above, and 10 wt % cellulose nanofibrils (CNF) were also prepared.

The following three silanes were tested: 3-aminopropyltriethoxysilane (APTES), 3-(triethoxysilyl)propylisocyanate (ICPTES), and trimethoxymethylsilane (MTMS). The structures of PLA and these three silanes are provided in FIG. 1.

Tensile Tests

Tensile tests of the nanocomposite films were performed on a customized micro testing system consisting of a high torque NEMA 23 stepper motor with optical encoders, an 11.1 N load cell, a custom slider linear air bearing. A LabVIEW™ virtual instrument was used for data acquisition and control. The entire system was mounted onto an air table to reduce mechanical vibrations. The load was transferred to the test specimens by adhesively bonding them with an instant adhesive onto a pair of stainless steel mounds. For the film test, the gauge length was 15 mm and the strain rate was set to 0.02 mm/sec. Five specimens were tested to provide the average and standard deviation.

Figure 2:
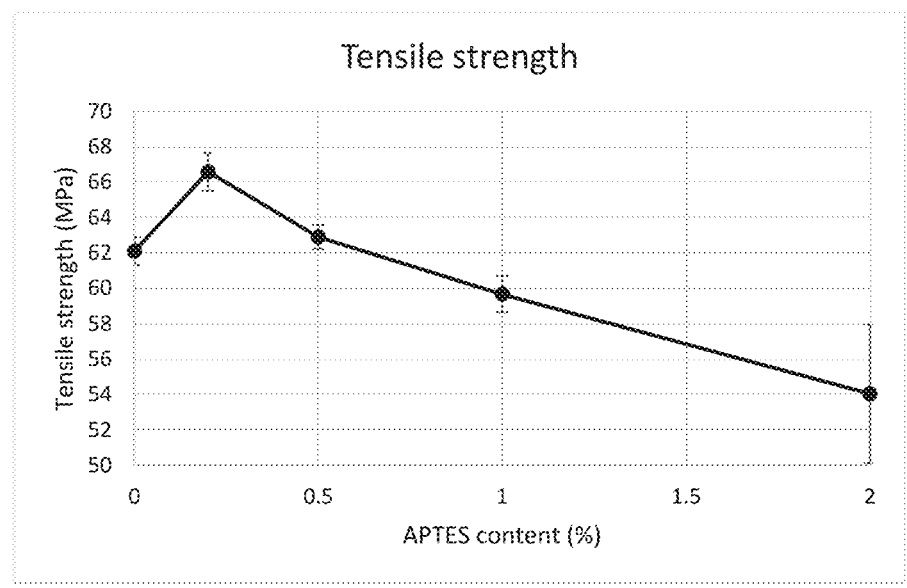
FIG. 2 is a graph plotting tensile strength of silane-modified PLA (i.e., SMPLA) with different contents of APTES.
Figure 3:
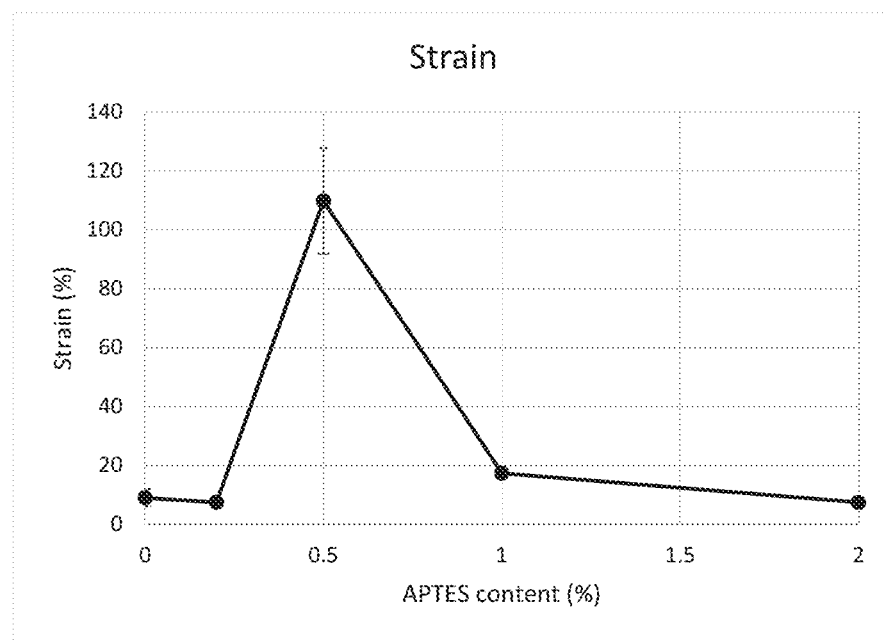
FIG. 3 is a graph plotting tensile strain of silane-modified PLA (i.e., SMPLA) with different contents of APTES.

FIG. 2 is a graph plotting tensile strength of silane-modified PLA (i.e., SMPLA) with different contents of APTES. FIG. 3 is a graph plotting tensile strain of silane-modified PLA (i.e., SMPLA) with different contents of APTES. As shown in FIG. 2, with 0.2 wt % APTES, the tensile strength of the silane modified PLA increased about 7% from 62.1 to 66.6 MPa. Yet, further increasing APTES loading caused decrease in tensile strength. On the other hand, as shown in FIG. 3, addition of APTES dramatically affected the ductility of PLA. Addition of 0.5 and 1.0 wt % of APTES increased the elongation-to-break 1220% and 100% respectively.

Figure 4:
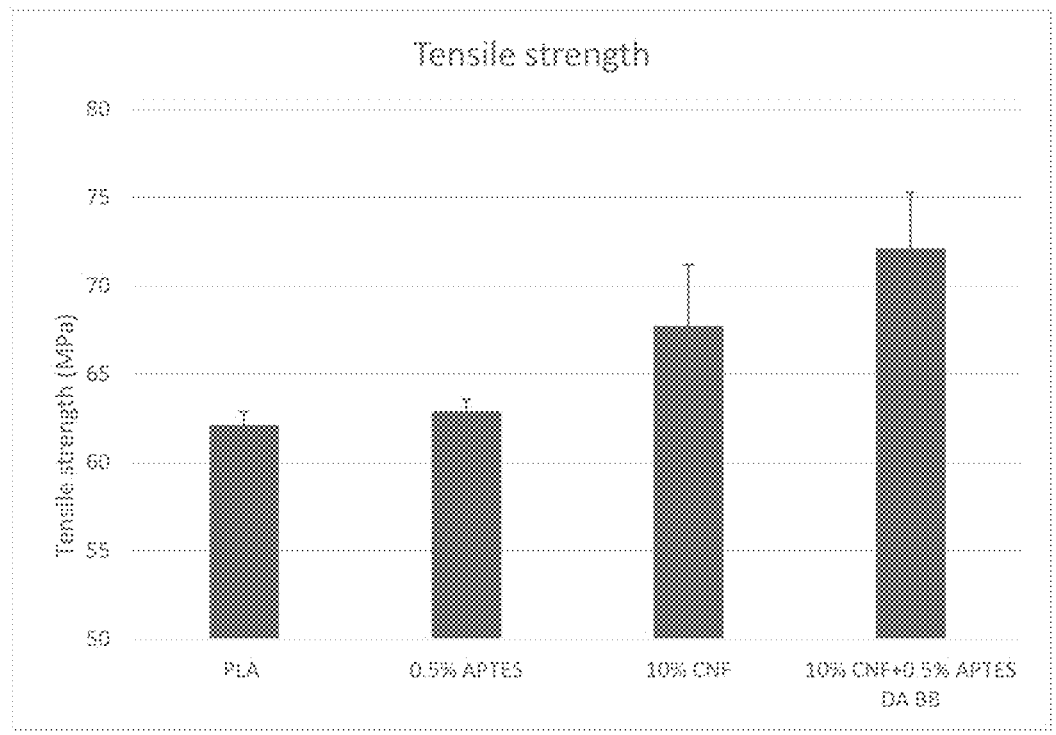
FIG. 4 is a graph plotting tensile strength of PLA; PLA+0.5% APTES; PLA+10% CNF; and PLA+10% CNF+0.5% APTES.
Figure 5:
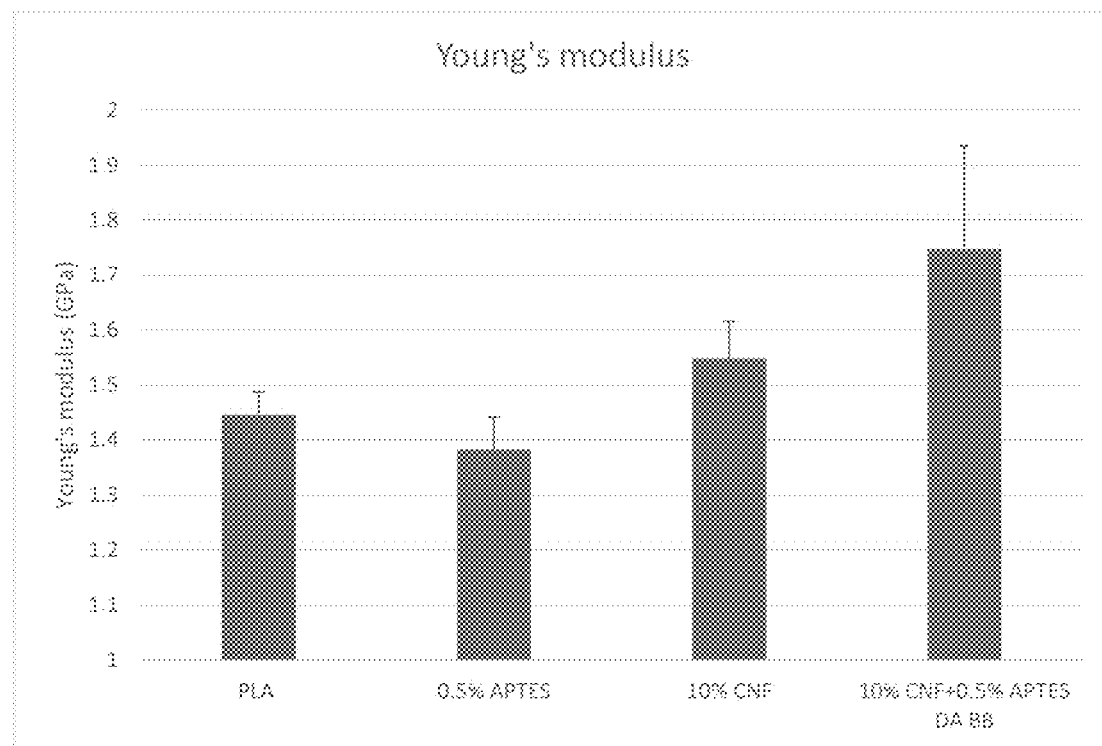
FIG. 5 is a graph plotting Young's modulus of PLA; PLA+0.5% APTES; PLA+10% CNF; and PLA+10% CNF+0.5% APTES.

Further experiments analyzed nanocellulose composites with SMPLA, using 0.5 wt % APTES and 10 wt % cellulose nanofibrils (CNF). FIG. 4 is a graph plotting tensile strength of PLA; PLA+0.5% APTES; PLA+10% CNF; and PLA+10% CNF+0.5% APTES. FIG. 5 is a graph plotting Young's modulus of PLA; PLA+0.5% APTES; PLA+10% CNF; and PLA+10% CNF+0.5% APTES. As shown by the data in FIGS. 4 and 5, the tensile strength of the nanocomposite of CNF and SMPLA is 16% higher and the Young's modulus is 21% higher than that of neat PLA.

The foregoing experiments demonstrate an approach that not only improves the mechanical properties of polylactic acid, but that can be applied to a host of other polyester polymers, such as PET, PBT, and PHB. Silanes with other functional groups, such as epoxy, isocyanate, and acryloyl should also be useful for purposes of the invention.

In-situ Condensation and Grafting of Organosilanes for Producing Supertough PLA Hybrid Blend Materials Supertough poly(lactic acid) (PLA) was achieved by simply mixing a small amount (0.5-1 wt %) of an organoalkoxysilane with PLA. Three organosilanes, (3-aminopropyl)triethoxysilane (APTES), 3-(triethoxysilyl)propyl isocyanate (ICPTES), and trimethoxymethylsilane (MTMS) were selected in this study to understand how the functional group on a silane affect the behavior of the PLA-silane hybrid blends. Remarkable improvement in ultimate tensile strain was observed in certain APTES- and ICPTES-modified PLA without significant loss in tensile strength and modulus. Glass transition temperatures measured by differential scanning calorimetry and dynamic mechanical analysis did not show any observable decrease. Without being bound by theory, a new mechanism is herein proposed, which is in situ condensation of organosilane and grafting with PLA to form silica-PLA core-shell nanocomplex. SEM and DLS experiments indicated nanofibrils/networks at fractured surfaces and nanoparticle formation (bimodal, 50-200 nm and <10 nm) in dilute solution. A rheological study also indicated increased chain entanglement in the polymer melts, which contributed to one order of magnitude higher complex viscosity and storage modulus. The simple PLA toughening strategy and the new mechanism revealed in this study opens a door to new performance polymer materials and mechanistic study.

Table 1 below shows the compositions of 12 samples studied in these experiments:

TABLE 1

PLA blends with different type and concentration of alkoxysilanes

| Sample | Blend | Silane type | Silane loading (wt %) |
|---|---|---|---|
| 1 | PLA 4043D | NA | 0 |
| 2 | PLA-0.25 APTES | APTES | 0.25 |
| 3 | PLA-0.5 APTES | APTES | 0.5 |
| 4 | PLA-1.0 APTES | APTES | 1.0 |
| 5 | PLA-2.0 APTES | APTES | 2.0 |
| 6 | PLA-0.25 ICPTES | ICPTES | 0.25 |
| 7 | PLA-0.5 ICPTES | ICPTES | 0.5 |
| 8 | PLA-1.0 ICPTES | ICPTES | 1.0 |
| 9 | PLA-2.0 ICPTES | ICPTES | 2.0 |
| 10 | PLA-0.5 MTMS | MTMS | 0.5 |
| 11 | PLA-1.0 MTMS | MTMS | 1.0 |
| 12 | PLA-2.0 MTMS | MTMS | 2.0 |

Figure 6:
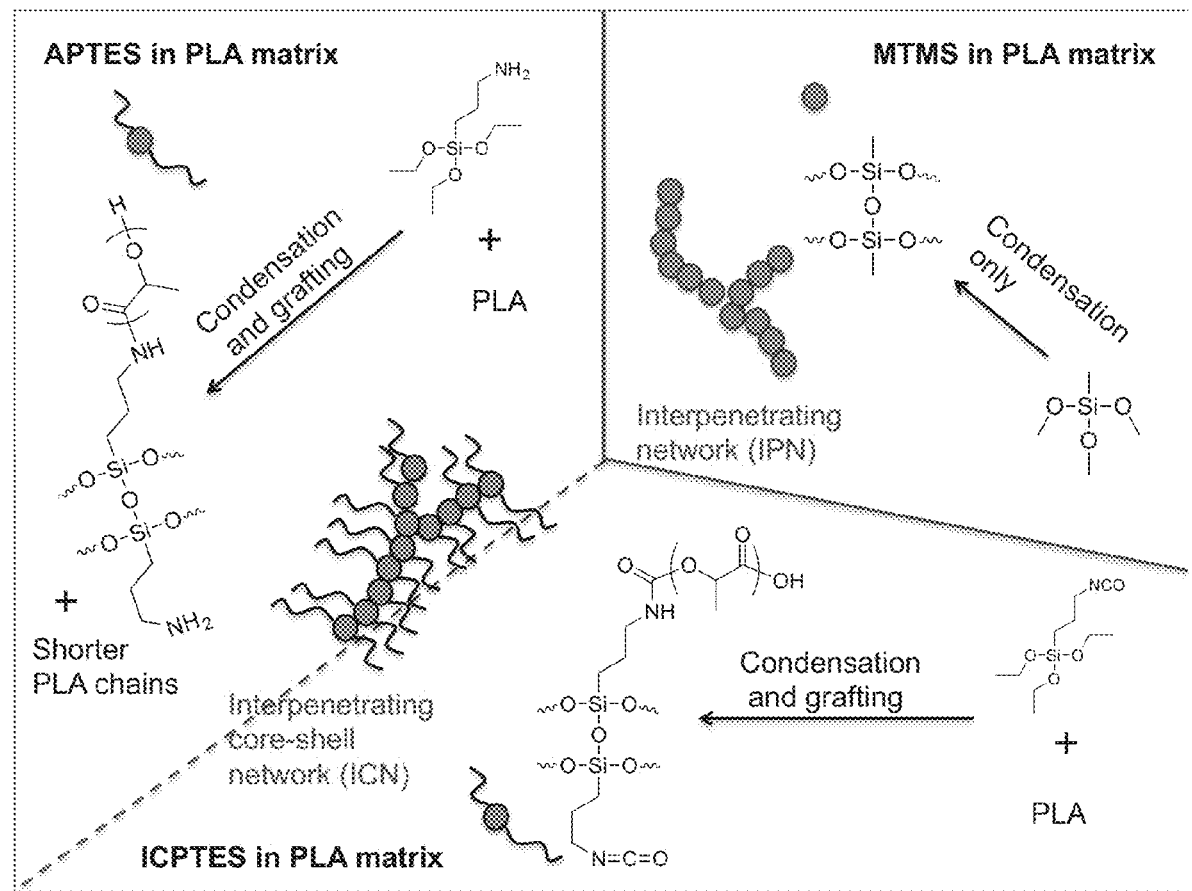
FIG. 6 is a schematic showing proposed reaction mechanisms between PLA and different alkoxysilanes, along with depiction of silica core formation and representative microstructure of PLA-silane hybrids.

The amine group will react with esters to form amide bonds by transesterification, while isocyanates react with both hydroxyl and carboxylic acid groups under mild conditions. Under the right conditions, PLA end-functionalized with an alkoxysilane functionality can be achieved by reacting with APTES or ICPTES. The alkoxysilane can further aggregate into micelle-like structures in a hydrophobic environment and eventually condense to silica network. Ideally, a core-shell structure will form in situ during the compounding process with a silica core surrounded by PLA shell. The silica core formation process is shown in FIG. 6.

Trimethoxymethylsilane (MTMS), which has no reactive functionality to PLA, cannot form the core-shell structure, but was mixed with PLA for comparison.

Figure 7A:
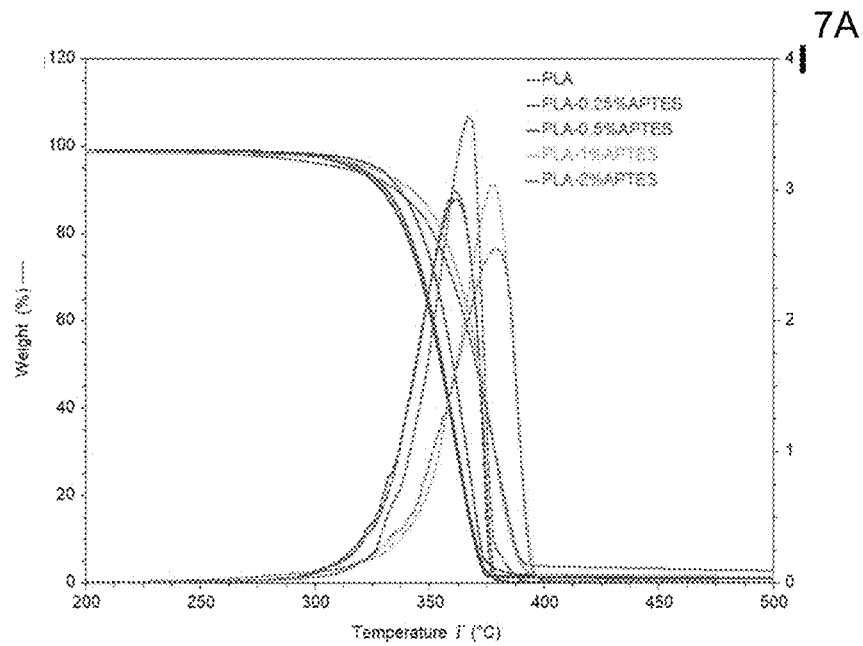
FIGS. 7A, 7B, and 7C are thermogravimetric curves for PLA-APTES, PLA-ICPTES, and PLA-MTMS hybrid blends, respectively.
Figure 7B:
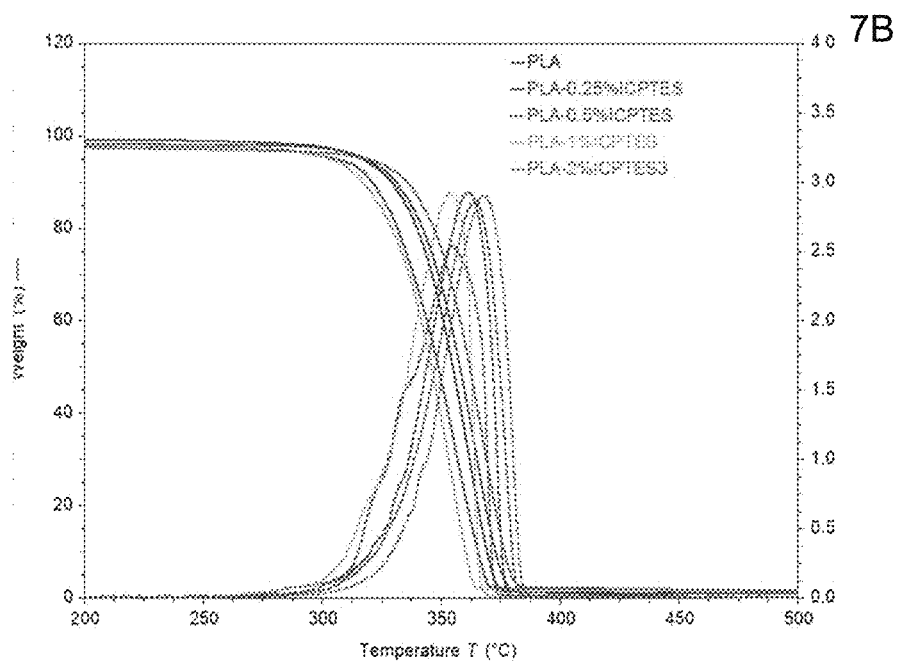
Figure 7C:
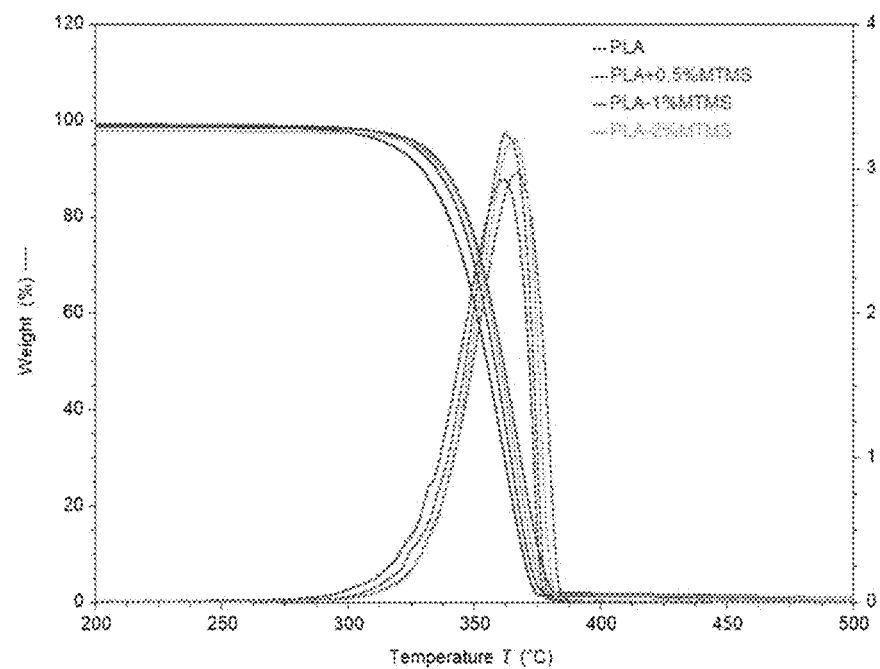

Thermogravimetric analysis (TGA) was performed to characterize the thermal stability of the silane-containing PLA blends. FIGS. 7A, 7B, and 7C show thermogravimetric curves of PLA-APTES, PLA-ICPTES, and PLA-MTMS hybrid blends, respectively. As shown by FIG. 7A, the addition of APTES improved the thermal stability of the PLA matrix under a nitrogen atmosphere, which is also evident from the onset decomposition temperatures shown in Table 2 below. In fact, an increase of stability of up to 17° C. was observed by comparing these results to neat PLA. This trend was also observed in the PLA sample with 0.5 wt % MTMS. This behavior can be attributed to the barrier effect of the PLA-silane particle layers against heat and mass transportation during decomposition (S. Sinha Ray et al., Progress in Materials Science 50(8) (2005) 962-1079). However, as indicated in FIG. 7B, the same trend was not observed when ICPTES was added into a PLA matrix. In fact, the decomposition temperatures of the hybrids decreased up to 10 degrees with the addition of ICPTES. This is likely due to the lower decomposition temperature of urethane.

TABLE 2

Thermal decomposition temperatures of PLA and its hybrids determined by the onset point of TGA thermograms

| Samples | Td (° C.) |
|---|---|
| PLA | 336 |
| PLA-0.25% APTES | 338 |
| PLA-0.5% APTES | 344 |
| PLA-1.0% APTES | 353 |
| PLA-2.0% APTES | 349 |
| PLA-0.25% ICPTES | 338 |
| PLA-0.5% ICPTES | 327 |
| PLA-1.0% ICPTES | 326 |
| PLA-0.5% MTMS | 341 |

Figure 8A:
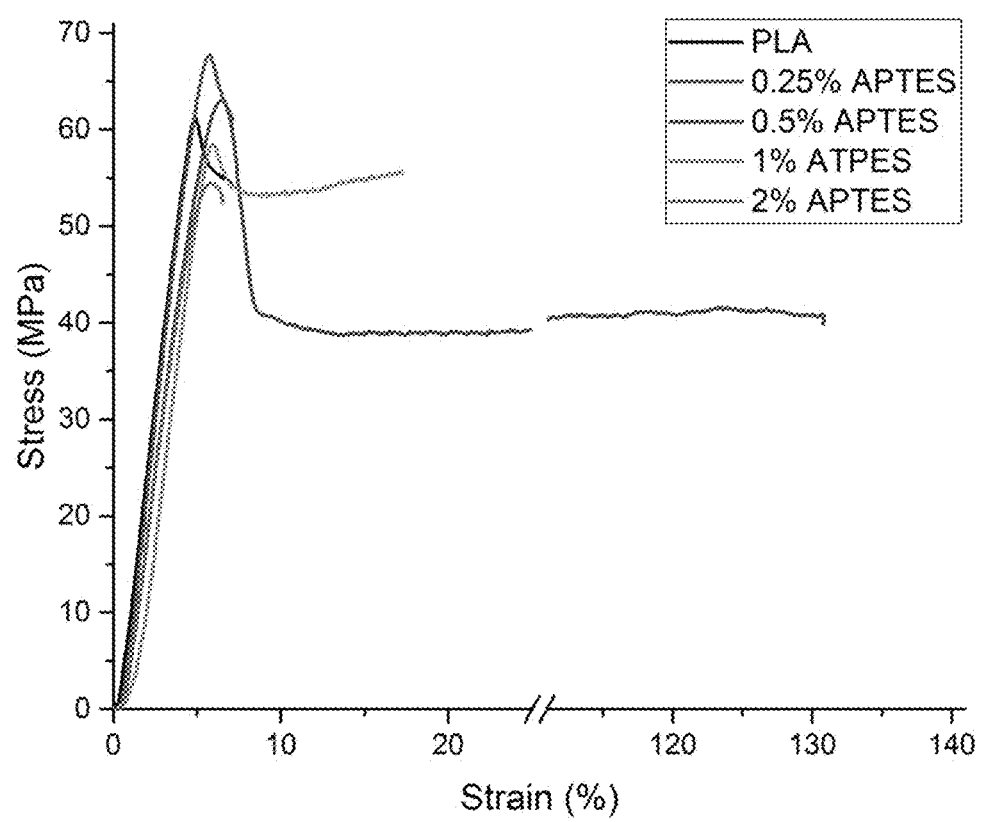
FIGS. 8A and 8B are graphs showing tensile properties of PLA-alkoxysilane blends for APTES and ICPTES silanes, respectively.
Figure 8B:
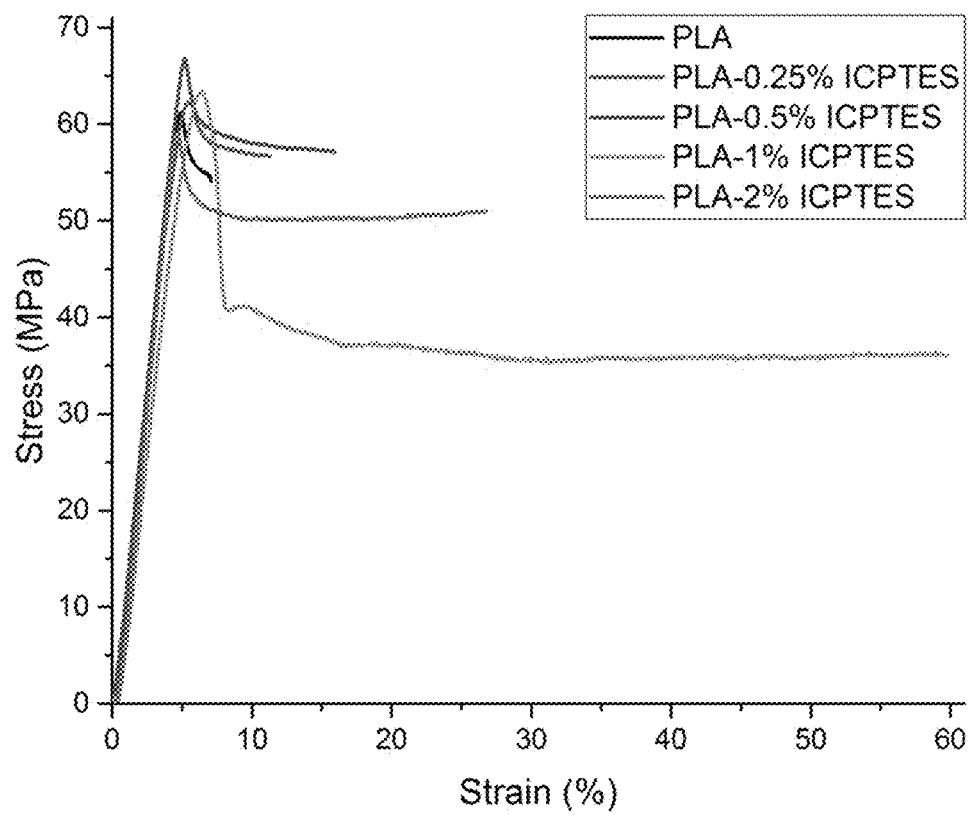

The tensile properties of PLA-alkoxysilane blends are presented in FIGS. 8A and 8B for APTES or ICPTES silanes, respectively. As shown in FIG. 8A, comparing to neat PLA, which has a tensile strength of about 62 MPa, the addition of various amounts of APTES first increased the ultimate strength by 6% at 0.25 wt % loading and then decreased the strength up to 13% when further adding APTES to 2 wt %. Young's moduli slightly decreased with the increase of APTES loading. Surprisingly, the elongation to break values of APTES modified PLA samples increased dramatically at 0.5 wt % loading of APTES. An over 12-fold increase in ultimate strain (109.7%) was achieved compared to only 9% ultimate strain for neat PLA. Increasing the APTES loading to 1 wt % gave an ultimate strain of 17.3%, which is still almost 2 times that of pristine PLA. At 2 wt % loading, the material's ultimate strain dropped below the value of the pristine PLA.

The decrease in ultimate tensile strength and Young's modulus at high APTES loading (e.g. 2%) can be attributed to the effect of aminolysis, which may lead to detrimental chain scission and degradation. At this point, it was still not clear exactly what contributed to the super-ductility at 0.5 and 1 wt % APTES, although the functionality on the silane that is reactive to PLA was likely a key factor. To verify this assumption, two more silanes, i.e. ICPTES and MTMS, were tested using the same condition. Based on the assumption, ICPTES, which has an isocyanate group that is capable of reacting with the carboxylic acid and hydroxyl end groups on PLA, may show a similar effect as APTES did once mixed with PLA. On the other hand, PLA-MTMS blends may show no or even an adverse effect on mechanical properties since MTMS does not contain any group that is reactive to PLA.

The tensile property of PLA-ICPTES blends from 0 to 1.0 wt % is presented in FIG. 8B. As shown, a similar trend with that of their APTES counterparts is observed. The ultimate tensile strengths and Young's moduli of the modified PLA did not show significant change. Only a slight increase of 6% in tensile strength and 8% in Young's modulus were observed at 0.5 wt % loading. At the same time, the tensile strain increased by 36% and 56% at 0.25 and 0.5 wt % ICPTES loadings compared to neat PLA. At 1 wt % loading, an impressive 8-fold improvement was observed. On the other hand, the PLA-MTMS blends showed a completely different scenario. Both tensile strength and modulus dropped around 10-15% with the addition of 0.5 and 1.0 wt % of MTMS, while the improvement in tensile strain (c.a. 50% increase at 1.0 wt %) was not as significant as that of the other two PLA-silane blends.

Super-tough and/or super-ductile PLA are of great value in commodity and engineering applications. So far, however, this goal has only been partially fulfilled as most current approaches usually improve PLA ductility by sacrificing ultimate strength and modulus, sometimes significantly. In the current study, PLA-silane hybrids with absolute ultimate tensile strain of 110% and 72% were successfully prepared. These ultimate tensile strains are 12 and 8 times, respectively, that of neat PLA. Meanwhile, the tensile strengths and moduli of original PLA were almost completely retained. Moreover, it should be noted that only 0.5 to 1 wt % of a silane agent was added to achieve such large improvements.

To better understand the intriguing mechanical behavior of the samples, dynamic scanning calorimetry (DSC) was conducted. The measured thermal and crystalline properties of PLA and PLA-alkoxysilane hybrid blends are provided in Table 3 below.

TABLE 3

Thermal and crystalline properties of PLA and PLA and its alkoxysilane hybrids.

| Sample | $T_g^a$ | $T_m^a$ | $_\Delta Hc^b$ | $_\Delta Hm^b$ | $\chi_c^b$ |
|---|---|---|---|---|---|
| PLA 4043D | 60 | 149.7 | N.O. | 3.54 | 3.80 |
| PLA-0.25% APTES | 60 | 149.4 | 8.936 | 15.41 | 6.98 |
| PLA-0.5% APTES | 60 | 149.3 | 9.286 | 12.37 | 3.33 |
| PLA-1.0% APTES | 57 | 149.3 | 6.748 | 8.791 | 2.22 |
| PLA-2.0% APTES | 58 | 146.7 | 23.88 | 27.48 | 3.95 |
| PLA-0.25% ICPTES | 51 | 149.5 | 10.48 | 11.91 | 1.54 |
| PLA-0.5% ICPTES | 60 | 148.6 | 15.80 | 20.12 | 4.67 |
| PLA-1.0% ICPTES | 59 | 148.8 | 6.668 | 8.342 | 1.82 |
| PLA-0.5% MTMS | 60 | 149.6 | 17.35 | 18.36 | 1.09 |

$^a T_g$ and $T_m$ values were obtained from the second-heat curve of DSC.
$^b$ Values calculated from the first-heat curve of DSC.
N.O.: no observed.

As shown in Table 3, the neat PLA (PLA 4043D) used in this research has a glass transition temperature ($T_g$) of 60° C. and a degree of crystallization ($\chi_c$) of 3.80%. The degree of crystallization changed after silane modification, and the tensile strength and modulus of the samples exhibited a correlation with $\chi_c$. Samples with higher typically showed a higher strength and modulus (e.g., PLA-0.25% ATPES and PLA-0.5% ICPTES). From DSC, PLA-1.0% APTES and PLA-2.0% APTES showed $T_g$s of 2-3 degrees lower, which can be attributed to the production of short PLA chains due to aminolysis by APTES. Overall, the $T_g$ of the PLA-silane blends did not change much. With observation of no significant decrease in $T_g$ and an almost unchanged tensile strength and modulus, it is apparent that a typical plasticizer effect cannot fully explain the dramatic improvement in ductility, especially for samples PLA-0.5% APTES and PLA-1.0% ICPTES.

Glass transition temperature data obtained by Dynamic Mechanical Analysis (DMA) further supported the idea that plasticization by silane reagents was not a contributor to the super ductile behavior of silane-PLA samples. The measured glass transition temperatures and storage moduli at 20° C., as measured by DMA, are provided in Table 4 below.

TABLE 4

Glass transition temperatures and storage modulus at 20° C. measured by DMA.

|  | Tg E' | Tg E" | Tg Tan | E' at 20° C. |
| --- | --- | --- | --- | --- |
| PLA | 59.3 | 60.3 | 68.9 | 1921 |
| PLA-0.25% APTES | 57.0 | 57.7 | 66.1 | 2130 |
| PLA-0.5% APTES | 57.5 | 58.8 | 67.6 | 2270 |
| PLA-1.0% APTES | 57.4 | 59.0 | 69.0 | 2188 |
| PLA-2.0% APTES | 54.7 | 56.9 | 67.4 | 2560 |
| PLA-0.25% ICPTES | 64.0 | 66.2 | 72.5 | 2985 |
| PLA-0.5% ICPTES | 62.2 | 63.0 | 70.7 | 3178 |
| PLA-1.0% ICPTES | 60.4 | 61.2 | 66.9 | 3105 |
| PLA-0.5% MTMS |  |  |  |  |
| PLA-1.0% MTMS | 53.0 | 53.8 | 64.1 | 2380 |

Figures 9A, 9B:
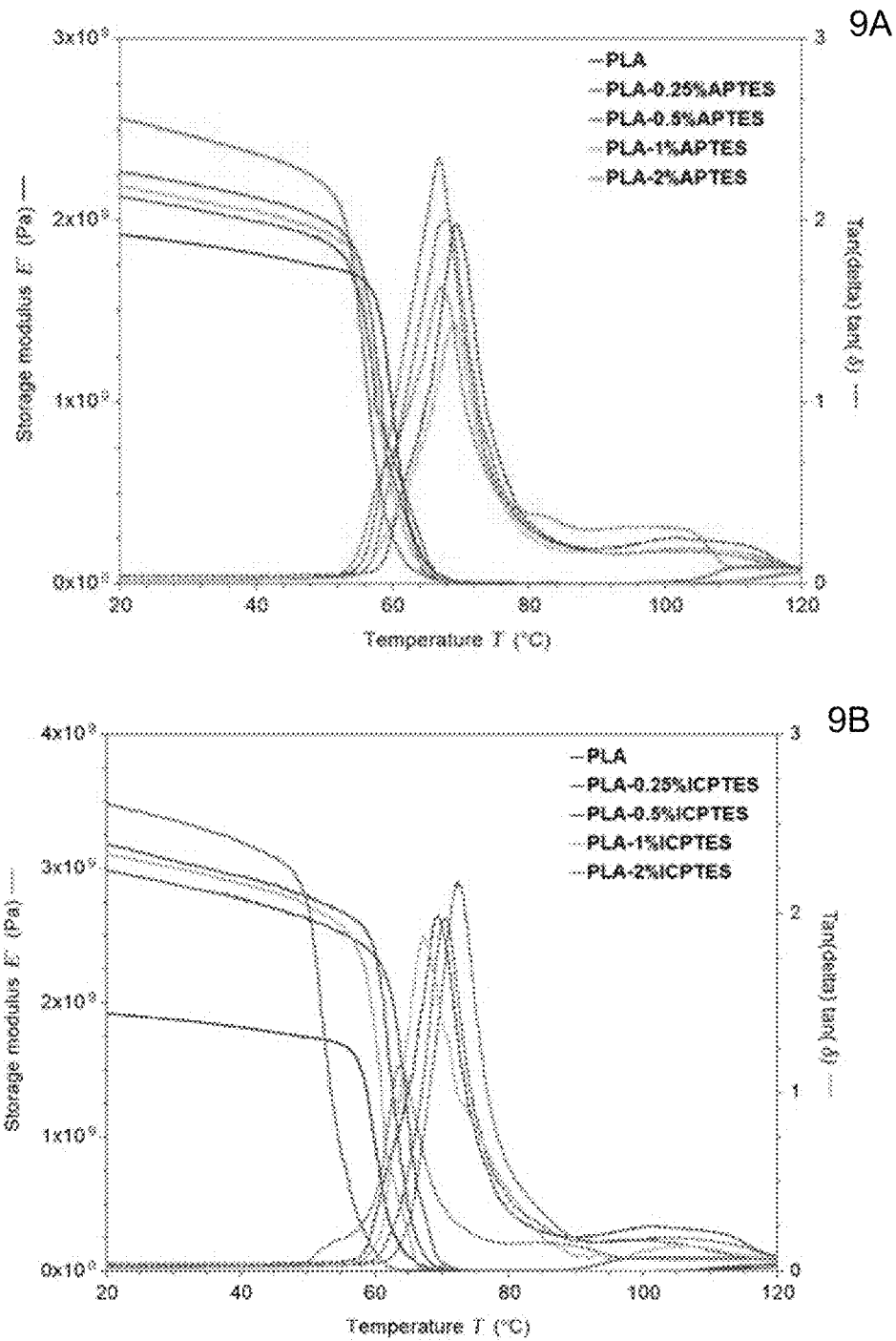
FIGS. 9A and 9B are temperature curves of storage modulus (E') and loss factor (tan δ) for PLA-silane blends containing APTES or ICPTES, respectively.

The temperature curves of storage modulus (E') and loss factor (tan δ) for PLA-silane blends containing APTES or ICPTES are shown in FIGS. 9A and 9B, respectively. As shown by FIGS. 9A and 9B, as APTES loading increased, a slight increase in E' is observed, and this trend is more prominent in ICPTES samples: E' of ICPTES-containing samples all increased about 50% compared with that of neat PLA.

Scanning electron microscope (SEM) images of fractured surfaces of neat PLA and PLA-silane hybrid specimens were also studied. The neat PLA specimen showed a relatively smooth fractured surface. PLA-silane hybrid specimens, however, exhibited completely different patterns. Instead of having a smooth surface, nano- and micro-sized fibrils are observed in silane-containing samples. The nanofibrils in PLA-1.0% ICPTES, in particular, appear to be interconnected to a nano-network. Fibrillation has been commonly observed in many PLA composites/blends where plasticizers ease chain motion and slippage. However, in this study, the plasticization effect has been excluded as evidenced by the DSC and DMA results. The evidence suggests that, with the amine and isocyanate functional groups on APTES and ICPTES reacting with PLA, the alkoxysilane may further condense to form star, bottle brush, or even network structures that contain silica cores and PLA shells. The nanofibrils and nano-network structures may have at least two functions: (i) they form interconnections within the PLA matrix, which contribute to the increase in ductility, and (ii) they contribute to the increase in elasticity at temperatures below $T_g$, as evidenced by the improvement in storage modulus from the DMA results. The SEM analysis of 2 wt % APTES blend shows the formation of micro-sized, instead of nano-sized, particles and fibers in the matrix. The evidence suggests that, at higher loading, silane molecules may have a higher tendency to form larger aggregates, which typically have a weaker interface interaction with the PLA matrix than their smaller counterparts. This observation may also explain the observation that higher APTES loadings (e.g. at 2 wt %) led to a decrease in stress and ultimate strain.

Figures 10A, 10B:
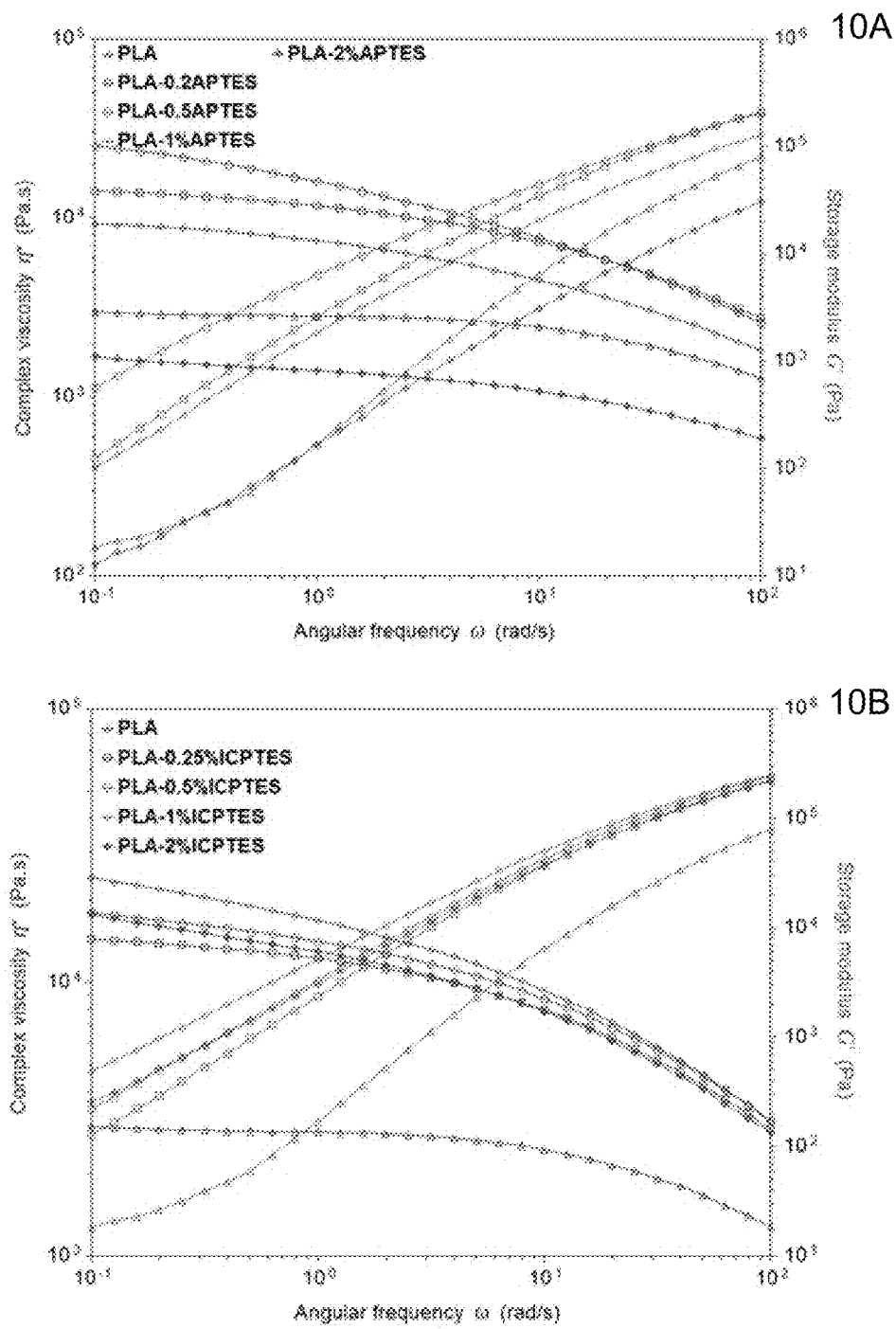
FIGS. 10A-10D are graphs showing the overall viscoelastic behavior (complex viscosity, η*, and storage modulus, G') of molten PLA and the silane-modified PLAs at angular frequencies from 0.1 to 100 rad/s.
Figure 10C:
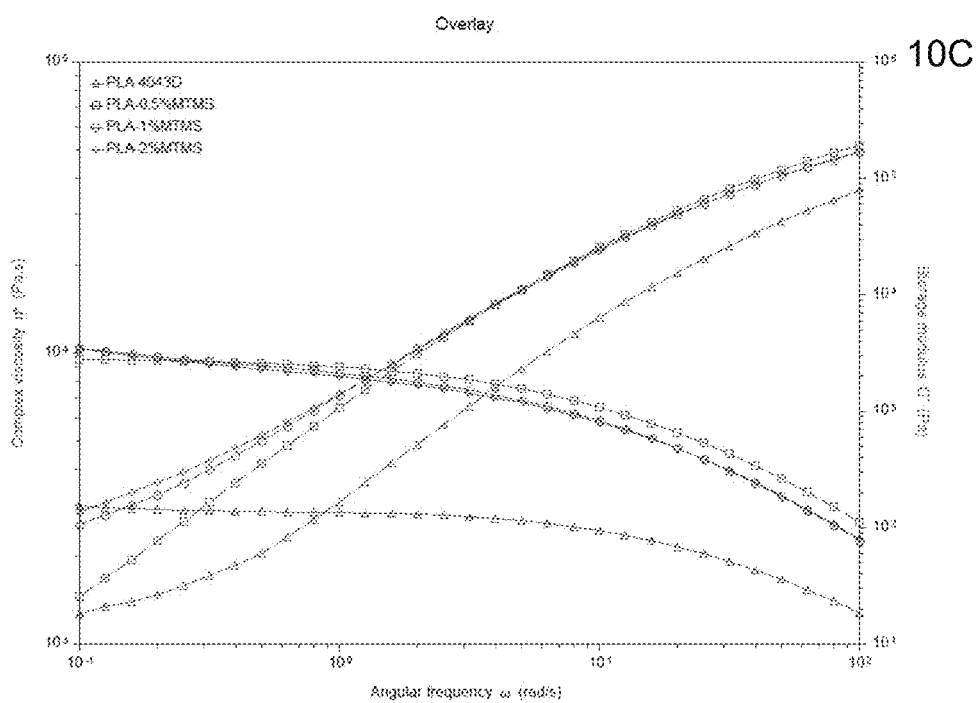
Figure 10D:
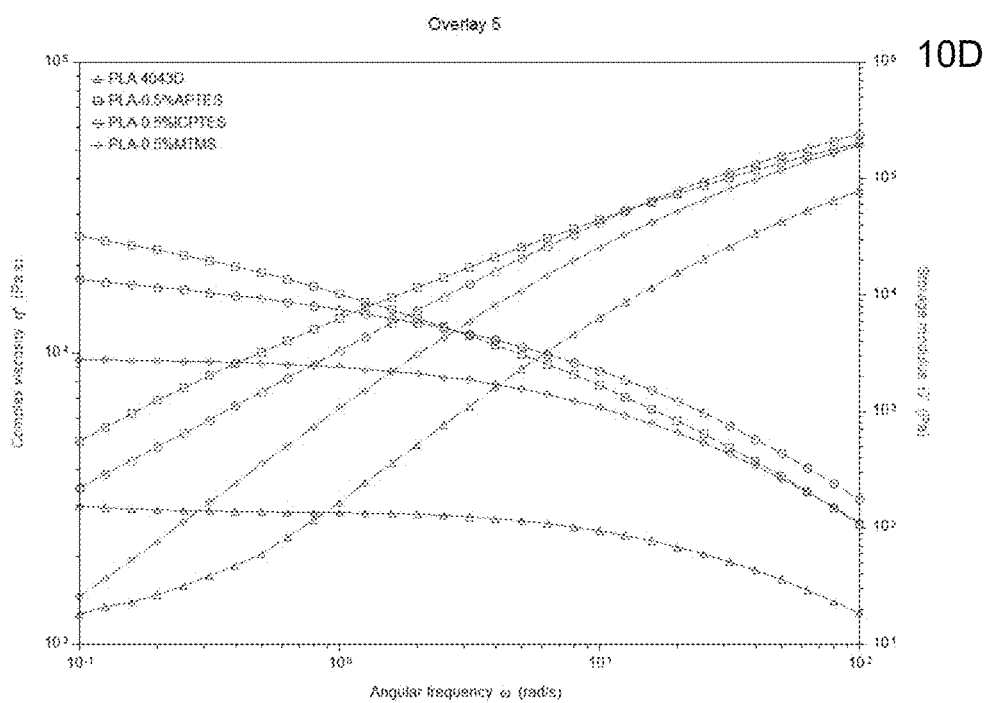

Subtle changes in molecular structure of polymers and polymer composites can alter the topological interactions (chain entanglement), chain fraction, as well as morphology. These changes will, in return, be manifested as differences in rheological behavior. Here, rheological studies were conducted on silane-modified PLA blends, in the hope of providing some insight into the viscoelastic behavior and microstructure of the new materials. FIGS. 10A-10D show the overall viscoelastic behavior (complex viscosity and storage modulus) of molten PLA and the silane-modified PLAs at angular frequencies from 0.1 to 100 rad/s. FIGS. 10A, 10B, and 10C show the results for PLA blends containing APTES, ICPTES, and MTMS, respectively, in varying concentrations of 0.5%, 1%, and 2%. FIG. 10D compares the results for PLA blends containing 0.5% APTES, 0.5% APTES, and 0.5% MTMS. As shown, the addition of silanes (i.e. APTES, ICPTES, and MTMS) all increased the storage modulus and viscosity of PLA, but in a different manner. The APTES-modified PLA showed a strong concentration dependency. The storage modulus and viscosity first increased to about one order of magnitude compared to neat PLA, as APTES was increased to 0.5%, and then the storage modulus and viscosity decreased to a value even lower than neat PLA when APTES was further increased to 2% (FIG. 10A). ICPTES-modified PLA also showed one order of magnitude improvement in storage modulus and viscosity (FIG. 10B). The values continued increasing as the ICPTES loading increased to 1%, and started to decrease when the ICPTES loading reached 2%. The amplitude of the changes is not as large as that of APTES-PLA samples. In contrast to APTES- and ICPTES-modified PLA, the viscoelastic behavior of MTMS-modified PLAs exhibited almost no concentration dependency (FIG. 10C), and the increase in storage modulus and viscosity are less significant.

Figure 11A:
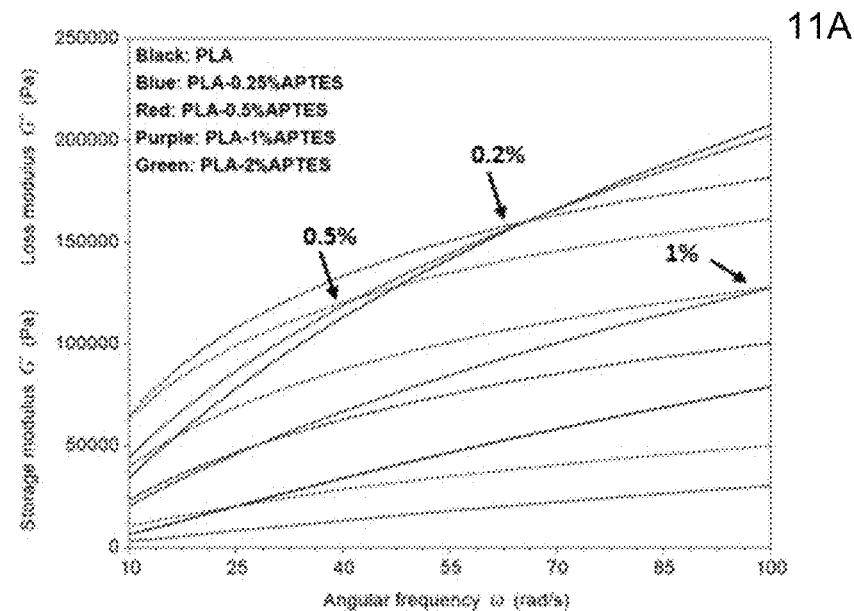
FIGS. 11A, 11B, and 11C are graphs showing storage modulus (G') and loss modulus (G") as a function of angular frequency (w) for PLA blends containing varying concentrations of APTES, ICPTES, and MTMS, respectively.
Figure 11B:
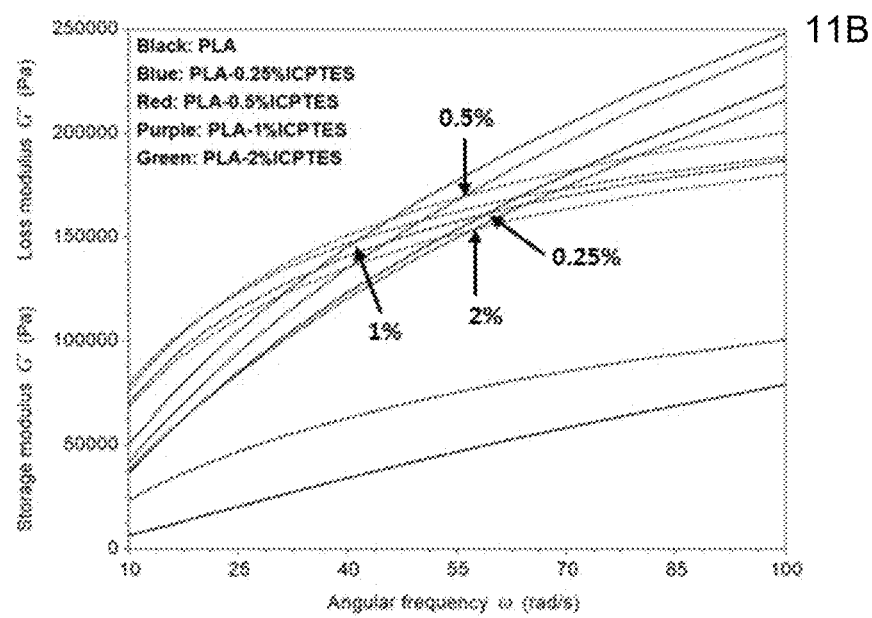
Figure 11C:
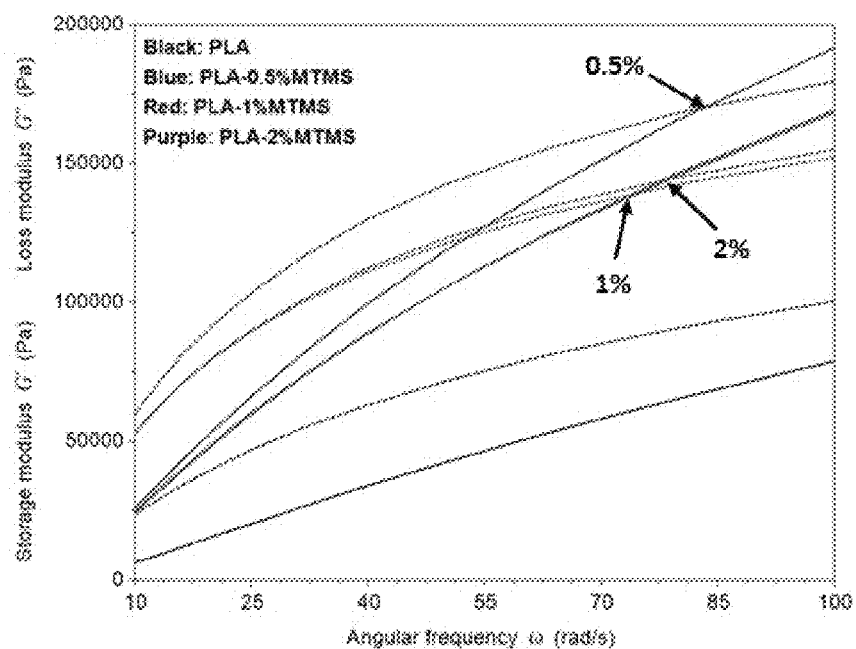

The crossover point of storage and loss modulus in a frequency (or oscillatory) sweep can be used to infer the microstructure of the material. Typically, a crossover point appearing at lower frequency indicates stronger interactions, either from high molecular weight, branched chain, crosslinking, or any other factors that increase chain entanglement. FIGS. 11A, 11B, and 11C show storage modulus (G') and loss modulus (G") as a function of angular frequency (w) for PLA blends containing varying concentrations of APTES, ICPTES, and MTMS, respectively. For APTES-modified PLA samples (FIG. 11A), the order of crossover points is PLA-0.5% APTES (40 rad/s)<PLA-0.2% APTES<PLA-1% APTES<<PLA and PLA-2% APTES, which indicates that PLA with 0.5% APTES has the strongest chain entanglement. This order is consistent with the trends in storage modulus and complex viscosity. As mentioned earlier, the amine group on APTES can react with PLA to generate an APTES-grafted PLA chain and a shorter chain. While an optimal amount of APTES was required to reach an ideally crosslinked microstructure, and thus, good mechanical and rheological properties, excessive APTES in the system became detrimental to maintaining a high chain entanglement. On the other hand, ICPTES (which contains the isocyanate group) reacts with PLA without generating shorter chains. As a result, as indicated by the data in FIG. 11B, the chain entanglement continues increasing as the ICPTES loading increases from 0.25 to 1%, which can be attributed to an increased degree of crosslinking. At 2% loading, the crossover point started to shift to a higher frequency, likely due to plasticizing of excessive ICPTES molecules that were not fully reacted. Again, MTMS modified PLA samples behaved totally different (FIG. 11C). The positions of the crossover points are not dependent on the concentration, and they are all around 70-80 rad/s. MTMS does not contain any functional group that is reactive to PLA. Thus, the nanostructures formed by in situ condensation of the MTMS organosilane had poor interaction with the PLA matrix, which led to weaker chain entanglement.

Figure 12:
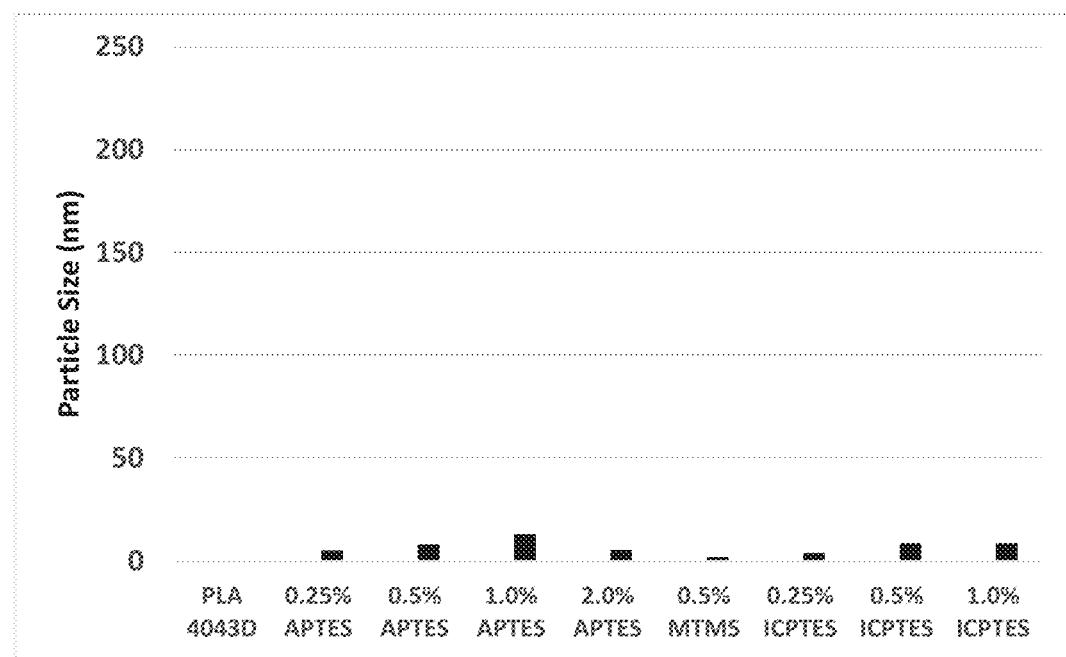
FIG. 12 is a graph showing the nanoparticle sizes of PLA and its silane-containing hybrid blends in dilute dichloromethane solution, as determined by dynamic light scattering (DLS).

Dynamic light scattering (DLS) was used to characterize the nanoparticle formation in the silane-modified PLA systems. FIG. 12 summarizes the nanoparticle sizes of PLA and its hybrids in dilute dichloromethane solution, as determined by DLS. As shown, the neat PLA samples showed no detectable nanoparticles. The PLA-0.5% MTMS sample showed nanoparticle sizes smaller than 5 nm. All the APTES-modified PLA systems and the ICPTES-modified PLA systems exhibited a bimodal particle size distribution. The smaller sized nanoparticles (10 nm or lower) can be attributed to the aggregation or condensation of the organosilanes without PLA grafting. This is likely also the origin of the nanoparticles in the PLA-0.5% MTMS sample. The larger nanoparticles (50-220 nm) are likely produced by the condensation of the organosilanes (APTES and ICPTES) with grafted PLA shell. The sharp drop in particle size from over 200 nm at 1% APTES to only 49 nm at 2% APTES is further evidence that excessive amine facilitated PLA chain scission by aminolysis.

During sample preparation, some difficulty was encountered in filtrating the PLA samples with 0.5 and 1% APTES and with 1% ICPTES through a 0.2 μm filter, which indicates that even larger particles exist in the solution. It was also observed that, through DLS, it is difficult to determine with certainty the shape of the nanoparticles (e.g., whether they are spherical, rod-like, thread-like, or in network form). A further observation is that the nanoparticle size and shape in dilute solution cannot directly represent those in the solid state. However, from indirect evidence, the DLS results clearly show that organosilanes, especially those with reactive functional groups (e.g., amine and isocyanate in this context), can alter the micro- or nano-structure of the PLA matrix.

In the present work, efforts were foremost directed to the preparation of supertough and superductile PLA with addition of only 0.5 to 1% organosilanes. Unlike many other approaches, such as employing plasticizers or polymer blends, no obvious decrease in tensile strength and modulus were observed in the present experiments. In situ formation of nanofibril and nano-network structures were observed by SEM. Two chemical processes are critical to altering the morphology, and thus, the mechanical properties of PLA hybrids: 1) condensation of the organosilanes is important to form the backbone or core in nanoscale, and 2) grafting of PLA chains by chemical bonding to the silane form PLA aurora or shell further facilitates the interfacial interaction between the nanostructure and the matrix. Thus, organosilanes with functional groups reactive to PLA (e.g., APTES and ICPTES) are preferred over their unreactive counterpart (i.e. MTMS, which satisfies only process 1). The DLS experiments further elucidated the formation of bimodal nanoparticles for APTES- and ICPTES-modified PLA samples, which are attributed to the condensation and grafting processes (for larger nanoparticles >50 nm) and the condensation-only process (for smaller nanoparticles, e.g., <10 nm). Complex viscosity and storage modulus of about one order of magnitude higher were achieved in samples with optimal silane concentration. The rheological experiments also evidenced the increase in molecular weight and chain entanglement for these samples.

While there have been shown and described what are at present considered the preferred embodiments of the invention, those skilled in the art may make various changes and modifications which remain within the scope of the invention defined by the appended claims.

What is claimed is:

1. A silane-modified polyester blend comprising a polyester polymer homogeneously blended with silane molecules containing two or three alkoxy groups bound to the silicon atom, wherein said silane molecules are present in said polyester blend in an amount of 0.05-4 wt %, wherein said polyester blend contains silica cores resulting from in situ self-condensation of said silane molecules, and wherein said silica cores are homogeneously dispersed in the polyester polymer as a result of said in situ self-condensation.

2. The polyester blend of claim 1, wherein said silane molecules are present in said polyester blend in an amount of 0.05-2 wt %.

3. The polyester blend of claim 1, wherein said polyester polymer is a polyhydroxyalkanoate within the following generic structure:

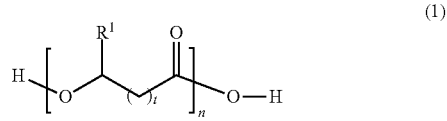

wherein $R^1$ is selected from a hydrogen atom or hydrocarbon group, t is an integer from 0 to 4, n is an integer of at least 5, and said generic structure can be a monomer or copolymer.

4. The polyester blend of claim 3, wherein said polyhydroxyalkanoate is selected from the group consisting of polylactic acid, polyglycolic acid, poly(3-hydroxypropionic acid), poly(hydroxybutyric acid)s, poly(hydroxyvaleric acid)s, or poly(hydroxyhexanoic acid)s, polycaprolactone, and polymandelic acid.

5. The polyester blend of claim 1, wherein said polyester polymer is a terephthalate-based polyester.

6. The polyester blend of claim 5, wherein said terephthalate-based polyester is polyethylene terephthalate or polybutylene terephthalate.

7. The polyester blend of claim 1, wherein said polyester polymer is an adipate-based or succinate-based polyester.

8. The polyester blend of claim 1, wherein said silane molecules have the following structure:

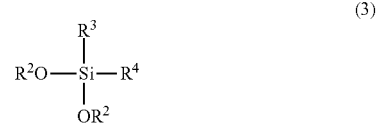

wherein:
$R^2$ groups are independently selected from alkyl groups containing 1-4 carbon atoms; and
$R^3$ and $R^4$ are independently selected from $OR^2$ groups and alkyl groups containing 1-12 carbon atoms, provided that at least one of $R^3$ and $R^4$ is said alkyl group containing 1-12 carbon atoms, wherein said alkyl group containing 1-12 carbon atoms optionally includes one or more heteroatoms selected from oxygen, nitrogen, halogen, sulfur, phosphorus, and silicon.

9. The polyester blend of claim 8, wherein said alkyl group containing 1-12 carbon atoms includes at least one heteroatom-containing functional group reactive with ester groups and/or hydroxy groups in the polyester polymer, thereby forming covalent bonds between the silane molecules and ester groups and/or hydroxy groups in the polyester polymer.

10. The polyester blend of claim 9, wherein said heteroatom-containing functional group is selected from the group consisting of amine, isocyanate, epoxy, carboxylic acid, carboxylic ester, acid anhydride, carboxamide, ureido, and aldehyde groups.

11. The polyester blend of claim 1, wherein said polyester blend further comprises filler particles.

12. The polyester blend of claim 11, wherein said filler particles contain groups reactive with the alkoxy groups on the silane molecules, thereby forming covalent bonds between the filler particles and silane molecules.

13. The polyester blend of claim 12, wherein said filler particles have a cellulosic composition.

14. The polyester blend of claim 12, wherein said filler particles have a metal oxide composition.

15. The polyester blend of claim 11, wherein said filler particles are present in said polyester blend in an amount of 0.1-50 wt %.

16. The polyester blend of claim 11, wherein said filler particles are present in said polyester blend in an amount of 0.1-20 wt %.

17. The polyester blend of claim 16, wherein the silane molecules are present in said polyester blend in an amount of 0.1-10 wt %.

18. The polyester blend of claim 1, wherein said silane molecules are present in said polyester blend in an amount of 0.05-3 wt %.

19. The polyester blend of claim 1, wherein said silica cores have a size of no more than 220 nm.

* * * * *